United States Patent
Lahlou et al.

(10) Patent No.: US 11,934,856 B2
(45) Date of Patent: Mar. 19, 2024

(54) JOINT PLACEMENT AND CHAINING OF VIRTUAL NETWORK FUNCTIONS FOR VIRTUALIZED SYSTEMS BASED ON A SCALABLE GENETIC ALGORITHM

(71) Applicants: Laaziz Lahlou, Montreal (CA); Nadjia Kara, Kirkland (CA); Claes Göran Robert Edström, Beaconsfield (CA)

(72) Inventors: Laaziz Lahlou, Montreal (CA); Nadjia Kara, Kirkland (CA); Claes Göran Robert Edström, Beaconsfield (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 599 days.

(21) Appl. No.: 17/263,033

(22) PCT Filed: Jul. 30, 2019

(86) PCT No.: PCT/IB2019/056492
§ 371 (c)(1),
(2) Date: Jan. 25, 2021

(87) PCT Pub. No.: WO2020/026142
PCT Pub. Date: Feb. 6, 2020

(65) Prior Publication Data
US 2021/0311769 A1    Oct. 7, 2021

Related U.S. Application Data

(60) Provisional application No. 62/711,841, filed on Jul. 30, 2018.

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5027* (2013.01); *G06F 9/5077* (2013.01);
(Continued)

(58) Field of Classification Search
CPC .................................................. G06F 9/45558
(Continued)

(56) References Cited

U.S. PATENT DOCUMENTS

| 8,418,183 | B2 * | 4/2013 | Nishimura | ............ G06F 9/5072 718/104 |
| 8,817,625 | B1 * | 8/2014 | Zhang | ................. H04L 41/5045 370/386 |

(Continued)

FOREIGN PATENT DOCUMENTS

| CN | 104202188 A | 12/2014 |
| CN | 108108815 A | 6/2018 |

(Continued)

OTHER PUBLICATIONS

Khebbache Selma et al: "A multi-objective non-dominated sorting genetic algorithm for VNF chains placement", 2018 15th IEEE Annual Consumer Communications & Networking Conference (CCNC), IEEE, Jan. 12, 2018 (Jan. 12, 2018), pp. 1-4.*

(Continued)

*Primary Examiner* — Mehran Kamran
(74) *Attorney, Agent, or Firm* — Julie Dufort; Ericsson Canada Inc.

(57) ABSTRACT

A system performs joint placement and chaining of virtual network functions (VNFs) based on a genetic algorithm in response to a request for virtual network services, including an in-line service. The request includes a description of a virtual network of VNFs and virtual links connecting the VNFs. A description of a physical network including servers and physical links is provided. Each chromosome in a
(Continued)

population encodes a mapping between the virtual links enumerated to form a locus and a corresponding sequence of server pairs. Each chromosome is evaluated against objective functions subject to constraints to identify a chromosome as a solution. The VNFs are placed on the servers according to the mapping encoded in the identified chromosome. According to the mapping, each VNF is mapped to one of the servers and each virtual link is mapped to a path composed of one or more of the physical links.

22 Claims, 8 Drawing Sheets

(51) Int. Cl.
    *H04L 41/5019* (2022.01)
    *H04L 43/0876* (2022.01)
    *H04L 67/60* (2022.01)

(52) U.S. Cl.
    CPC ...... *H04L 41/5019* (2013.01); *H04L 43/0876* (2013.01); *H04L 67/60* (2022.05); *G06F 2009/45595* (2013.01)

(58) Field of Classification Search
    USPC .............................................................. 718/1
    See application file for complete search history.

(56) References Cited

U.S. PATENT DOCUMENTS

| | | | |
|---|---|---|---|
| 9,137,161 B2* | 9/2015 | Zhang | H04L 47/2408 |
| 9,319,324 B2* | 4/2016 | Beheshti-Zavareh | H04L 45/02 |
| 9,391,905 B2 | 7/2016 | Zhang | |
| 9,445,279 B2* | 9/2016 | Li | H04W 88/16 |
| 9,503,391 B2* | 11/2016 | Xia | H04L 47/782 |
| 9,584,371 B2* | 2/2017 | Zhang | H04L 41/5054 |
| 9,628,380 B2* | 4/2017 | Xia | H04L 45/306 |
| 9,894,165 B2* | 2/2018 | Yazir | H04L 47/829 |
| 9,954,758 B2* | 4/2018 | N. | H04L 43/16 |
| 10,320,698 B1* | 6/2019 | Allen | H04L 41/12 |
| 2016/0212017 A1* | 7/2016 | Li | H04L 41/5048 |
| 2017/0019302 A1* | 1/2017 | Lapiotis | H04L 41/0813 |
| 2017/0026235 A1* | 1/2017 | Famaey | H04L 67/51 |
| 2017/0126500 A1* | 5/2017 | Eggen | H04L 41/40 |
| 2017/0279672 A1* | 9/2017 | Krishnan | G06F 9/45558 |
| 2017/0288971 A1* | 10/2017 | Jayaraman | H04L 41/5051 |
| 2017/0318097 A1* | 11/2017 | Drew | H04L 41/0897 |
| 2017/0371692 A1* | 12/2017 | Connolly | G06F 9/45558 |
| 2018/0077080 A1* | 3/2018 | Gazier | H04L 47/83 |
| 2018/0219762 A1* | 8/2018 | Wang | H04L 41/0895 |
| 2018/0227244 A1* | 8/2018 | Zhang | H04L 41/12 |
| 2019/0045374 A1* | 2/2019 | Loomba | H04W 28/0226 |
| 2021/0311769 A1* | 10/2021 | Lahlou | H04L 67/60 |
| 2023/0170047 A1* | 6/2023 | Yang | G16B 40/20 705/2 |

FOREIGN PATENT DOCUMENTS

| | | |
|---|---|---|
| CN | 108322333 A | 7/2018 |
| WO | 2019012485 A1 | 1/2019 |

OTHER PUBLICATIONS

Cao ("VNF-FG design and VNF placement for 5G mobile networks" Science China Information Services, Apr. 2017 ).*
Kim ("VNF-EQ: dynamic placement of virtual network functions for energy efficiency and QoS guarantee in NFV", Cluster Computing 20(3), pp. 2107-2117, Jul. 2017).*
Rankothge ("Experimental Results on the use of Genetic Algorithms for Scaling Virtualized Network Functions", 2015 IEEE Conference on Network Function Virtualization and Software Defined Network (NFV-SDN), pp. 47-53).*
Rankothge ("Towards Making Network Function Virtualization a Cloud Computing Service", IFIP, 2015, pp. 89-97).*
Carpio ("VNF Placement with Replication for Load Balancing in NFV Networks"—IEEE ICC 2017 SAC Symposium SDN & NFV Track).*
A. Alleg et al., Delay-aware VNF Placement and Chaining based on a Flexible Resource Allocation Approach, Copyright notice CNSM 2017: 978-3-901882-98-2 (c) 2017 IFIP.
B. Addis et al., Virtual Network Functions Placement and Routing Optimization, HAL Id: hal-01170042, https://hal.inria.fr/hal-01170042v1, Submitted on Jul. 1, 2015 (v1), last revised Sep. 12, 2015 (v2).
B. Yi et al., A comprehensive survey of Network Function Virtualization, Elsevier, Computer Networks 133 (2018) 212-262.
C. Ghribi et al., A Dynamic Programming Algorithm for Joint VNF Placement and Chaining, CAN'16, Dec. 12, 2016, Irvine, CA, USA.
C. Pham et al., Traffic-aware and Energy-efficient vNF Placement for Service Chaining: Joint Sampling and Matching Approach, IEEE Transactions on Services Computing, 1939-1374 (c) 2016 IEEE.
ETSI, Network Functions Virtualisation (NFV) Release 3; Evolution and Ecosystem; Report on Network Slicing Support with ETSI NFV Architecture Framework, GR NFV-EVE 012 V3.1.1 (Dec. 2017).
ETSI, Network Functions Virtualisation (NFV); Use Cases, GS NFV 001 V1.1.1 (Oct. 2013).
F. Bari et al., On Orchestrating Virtual Network Functions in NFV, arXiv:1503.06377v2 [cs.NI], Mar. 25, 2015.
K. Deb et al., A Fast and Elitist Multiobjective Genetic Algorithm:NSGA-II, IEEE Transactions on Evolutionary Computation, vol. 6, No. 2, Apr. 2002.
M. C. Luizelli et al., A fix-and-optimize approach for efficient and large scale virtual hetwork function placement and chaining, Elsevier, Computer Communications 102 (2017) 67-77.
M. C. Luizelli et al., Piecing Together the NFV Provisioning Puzzle: Efficient Placement and Chaining of Virtual Network Functions, 978-3-901882-76-0 @2015 IFIP.
M. Gen et al., Genetic Algorithms and Engineering Optimization , ISBN 0-471-31531-1, Copyright 2000 by John Wiley & Sons, Inc.
M. Mechtri et al., A scalable algorithm for the placement of service function chains, HAL Id: hal-01355234, https://hal.archives-ouvertes.fr/hal-01355234, Submitted on Aug. 22, 2016.
R. Cohen et al., Near Optimal Placement of Virtual Network Functions, 2015 IEEE Conference on Computer Communications (INFOCOM).
R. Mijumbi et al., Network Function Virtualization: State-of-the-art and Research Challenges, arXiv:1509.07675v1 [cs.NI] Sep. 25, 2015.
S. Ayoubi et al., Breaking Service Function Chains with Khaleesi, ISBN 978-3-903176-08-9 2018 IFIP.
S. Khebbache et al., A Multi-objective Non-dominated Sorting Genetic Algorithm for VNF Chains Placement, 2018 15th IEEE Annual Consumer Communications & Networking Conference (CCNC).
S. Khebbache et al., Virtualized network functions chaining and routing algorithms, Elsevier, Computer Networks 114 (2017) 95-110.
W. Rankothge et al., Experimental Results on the use of Genetic Algorithms for Scaling Virtualized Network Functions, 2015 IEEE Conference on Network Function Virtualization and Software Defined Network (NFV-SDN).
Wikipedia, Facility Location Problem, Page was last edited on May 15, 2018.
ISR and Written opinion from corresponding application PCT/IB2019/056492.

* cited by examiner

*Input*: Chromosome
*Output*: Fixed chromosome
*Begin*
1. *Initialization*
2. X_L = {}                             // store the left end points of the virtual links
3. X_R = {}                             // store the left right points of the virtual links
4. X_I = {}                             // store the virtual links having common end point
5. //*Decoding the chromosome*
6. Foreach vLink in Chromosome do
7.          x_l = []
8.          x_r = []
9.          x_i = []
10 Foreach v in Chromosome do
11.         If (v and vLink) have similar left end point then    // start with left end points
12.                 x_l.append(v)
13.                 X_L [vLink] = x_l
14.         Endif
15.         If (v and vLink) have similar right end point then   // move to right end points
16.                 x_r.append(v)
17.                 X_R [vLink] = x_r
18.         Endif
19.         If (v and vLink) have common end point then          // finally, to common end points
20.                 x_i.append(v)
21.                 X_I [vLink] = x_i
22.         Endif
23.     Endforeach
24. Endforeach
25. Call (Affinity_Anti_affinitiy algorithm)
//*Fixing the chromosome*
26. Foreach vLink in Chromosome do
27.             If vLink in X_L then              //Start with the vLinks having the same left end point
28.                     Foreach element in X_L[vLink] do
29.                             Index = GetLeftLocation(vLink)
30.                             SetSameLocation(element)
31.                     Endforeach
32.             Endif
33.     If vLink in X_L then                     //Move to the vLinks having the same right end point
34.             Foreach element in X_L[vLink] do
35.                     Index = GetRightLocation(vLink)
36.                     SetSameLocation(element)
37.             Endforeach
38.     Endif
39.     If vLink in X_L then                     //Finally, the vLinks having the common end point
40.             Foreach element in X_L[vLink] do
41.                     Index = GetRightLocation(vLink)
42.                     SetSameLocation(element)
43.             Endforeach
44.     Endif
45. Endforeach
46. Foreach vLink in Chromosome do
47.         Start = GetLeftLocation(vLink)
48.         End = GetRightLocation(vLink)
49.         Path = GetPathUsingDijkstra (Start, End)
50.         SetPath(vLink, Path)
51. Endforeach

FIG. 4

*Input*: Chromosome

*Begin*

1. Affinity = GetAffinity (Chromosome)
2. Affinity_loc_x = GetLocationVNF(Affinity[0])
3. Affinity_loc_y = GetLocationVNF(Affinity[1])

4. Affinity_loc_x = Affinity_loc_y

5. *Foreach vLink in Chromosome do*
6.     *If GetLefLocation(vLink)* == Affinity[0] or
7.     *GetLefLocation(vLink)* == Affinity[1] *then*
8.         *SetSameLocation(Affinity_loc_x)*
9.     *Endif*
10.     *If GetRightLocation(vLink)* == Affinity[0] or
11.     *GetRightLocation(vLink)* == Affinity[1] *then*
12.         *SetSameLocation(Affinity_loc_x)*
13.     *Endif*
14. *Endforeach*

15. Antiaffinity = GetAntiAffinity (Chromosome)
16. Anti_Affinity_loc_x = GetLocationVNF(Anti_Affinity[0])
17. Anti_Affinity_loc_y = GetLocationVNF(Anti_Affinity[1])

18. *Foreach vLink in Chromosome do*
19.     *If GetLefLocation(vLink)* == Anti_Affinity[1] *then*
20.         *SetSameLocation*(Anti_Affinity_loc_y)
21.     *Endif*
22.     *If GetRightLocation(vLink)* == Anti_Affinity[1] *then*
23.         *SetSameLocation*(Anti_Affinity_loc_y)
24.     *Endif*
25.     *If GetLefLocation(vLink)* == Anti_Affinity[0] *then*
26.         *SetSameLocation*(Anti_Affinity_loc_x)
27.     *Endif*
28.     *If GetRightLocation(vLink)* == Anti_Affinity[0] *then*
29.         *SetSameLocation*(Anti_Affinity_loc_x)
30.     *Endif*
31.     *Endforeach*

*End*

FIG. 5

JOINT PLACEMENT AND CHAINING OF VIRTUAL NETWORK FUNCTIONS FOR VIRTUALIZED SYSTEMS BASED ON A SCALABLE GENETIC ALGORITHM

CROSS-REFERENCE TO RELATED APPLICATIONS

This application claims the benefit of U.S. Provisional Application No. 62/711,841 filed on Jul. 30, 2018.

TECHNICAL FIELD

Embodiments of the invention relate to a scalable multi-objective evolutionary method for the joint placement and chaining of Virtual Network Functions (VNFs) for virtualized systems in enterprise communication networks.

BACKGROUND

Virtual Network Functions (VNFs) are virtualized functions that were executed on dedicated, close and proprietary hardware. These network functions were mainly deployed by service providers to process traffic of different types to network services offered to end users. Following an internal specific policy, the traffic flows through a set of deployed network functions in a predefined and logical order, known as, service function chains or in-line services.

Network Function Virtualization (NFV) is a paradigm and architecture for service and cloud providers to deliver next-generation network and cloud services to end-users. NFV allows rapid composition of VNFs in sequence to form a service function chain or in-line service with the benefits of, just to name a few: on-demand resource allocation, a higher level of automation and scaling capabilities to handle traffic fluctuations and very demanding requirements specifically related to the Service Level Agreement (SLA). Throughout this disclosure, in-line service and service function chain are used interchangeably. Thanks to the NFV paradigm, the core operating software of these network functions is decoupled from the hardware allowing more flexibility, openness, manageability and fosters innovation and reusability.

The in-line services comprise the deployment of network functions, e.g. firewall, network address translations, intrusion detection systems, proxy, etc., either using containers or virtual machines. Efficient resource allocation mechanisms, i.e. joint allocation of computing and network resources, for these in-line services are necessary to fully reap the expected benefits of NFV and provide them with the desired level of Quality of Service (QoS).

With the advent of 5G and network slicing, network services are becoming complex. Network services may be composed of an in-line service in addition to network service-based VNFs interconnected together to form a complex service topology. Yet, network services have different and stringent requirements to be fulfilled both during the deployment phase and after being deployed following the SLA agreed upon between the service provider and the clients.

None of the existing solutions enable a joint placement and chaining of VNF for service function chains with more than 4 VNFs. Moreover, most of the existing solutions focus on the after-deployment phase and consider only in-line services (e.g., Firewall, Proxy, Cache) instead of virtual network services that include in-line services and VNFs (e.g., IMS CSCFs, Video streaming application, Web application). Additionally, current approaches do not offer a reliable VNF placement and chaining, as they do not consider service constraints, and also in cases of single optimization method only a single solution is generated.

SUMMARY

In one embodiment, a method is provided for joint placement and chaining of a scalable number of VNFs. The method comprises receiving a request for virtual network services, the request including a first description of a virtual network including the VNFs and virtual links connecting the VNFs. A subset of the VNFs form a server function chain to provide an in-line network service. The method further comprises obtaining a second description of a physical network including servers and physical links. A population of chromosomes is initialized. Each chromosome encodes a mapping between the virtual links enumerated to form a locus and a corresponding sequence of server pairs. Endpoint VNFs of each virtual link are mapped to a server pair connected by one or more of the physical links. For each of a plurality of generations of the population which evolves according to a genetic algorithm, each chromosome within the population is evaluated against a set of objective functions subject to a set of constraints to identify a chromosome as a solution. The VNFs are placed on the servers according to the mapping encoded in the identified chromosome. The mapping maps each VNF to one of the servers and each virtual link to a path composed of one or more of the physical links.

In another embodiment, there is provided a network node comprising processing circuitry and memory. The memory stores instructions executable by the processing circuitry to perform joint placement and chaining of a scalable number of VNFs. The network node is operative to perform the aforementioned method.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached figures.

FIG. 4 illustrates a portion of a cultural genetic algorithm according to one embodiment.

FIG. 5 illustrates another portion of a cultural genetic algorithm according to one embodiment.

DETAILED DESCRIPTION

Figure 1:
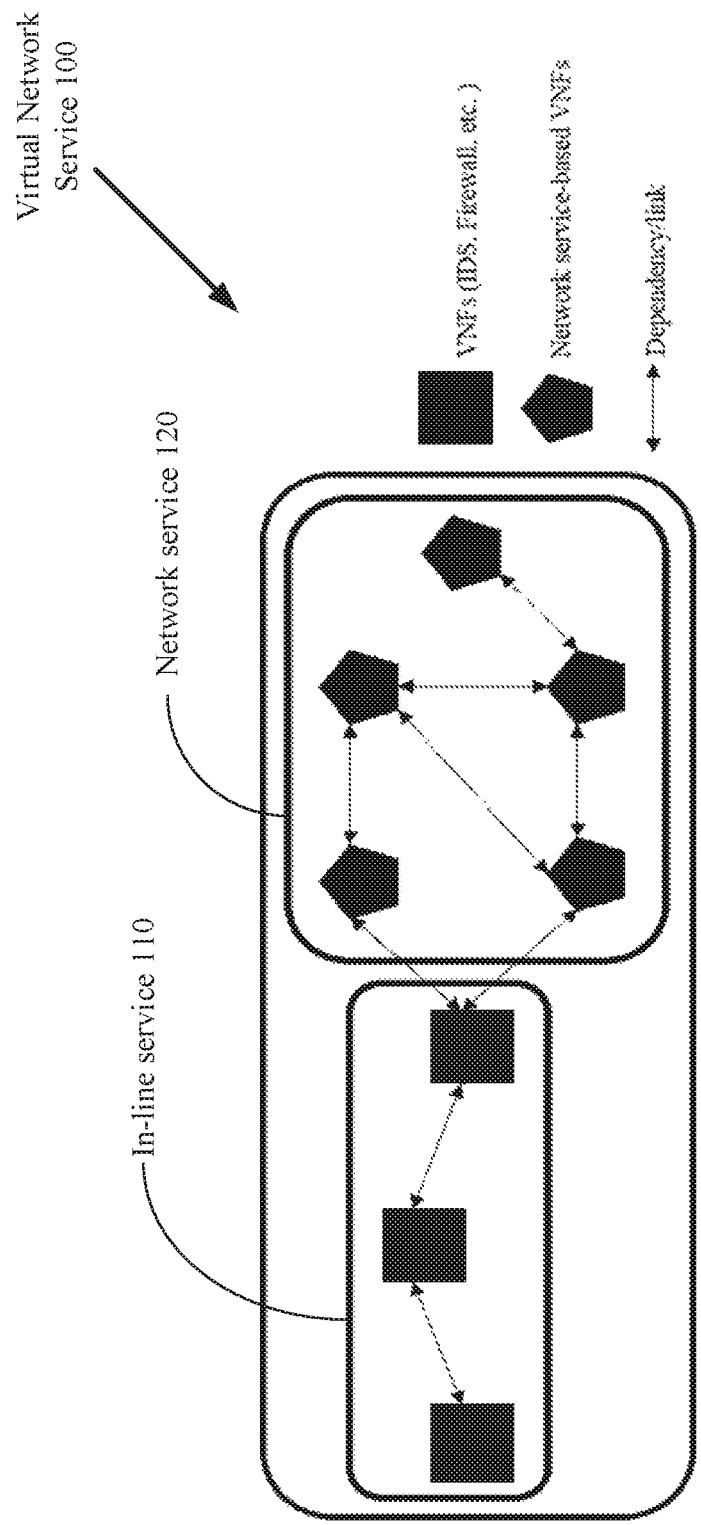
FIG. 1 is a block diagram illustrating an example of a virtual network service according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

A method for the joint placement and chaining of VNFs is disclosed herein. The disclosed method may be performed offline as well as online; e.g. in real-time in response to network service requests. The disclosed method is based on a multi-objective evolutionary genetic algorithm (also referred to as an evolutionary cultural genetic algorithm, a cultural genetic algorithm or a genetic algorithm), which efficiently enables the joint placement and chaining of VNFs in one step using a genotype encoding mechanism. The disclosed method is scalable, i.e. its applicability is not limited to in-line services with only 3 to 4 VNFs; rather, it is scalable to virtual network services including in-line services with more than 4 VNFs. An apparatus to support the disclosed method is provided in a physical environment, which may include server(s), local memory and network interfaces for external connections.

According to the disclosed method, the virtual network service is represented by a virtual network topology according to the graph theory formalism. All of the virtual links composing the virtual network service are enumerated from the graph representation. Akin to the virtual network service, the physical network is represented by a physical network topology according to the graph theory formalism. A genotype encoding mechanism encodes the enumerated virtual links and corresponding servers in the physical network. A population of chromosomes are generated, with each chromosome including a locus (i.e. an ordered sequence) of the enumerated virtual links and corresponding servers, with each virtual link mapped to a physical path connecting a server pair. A cultural genetic algorithm is applied to the population of chromosomes, which evolves over a number of generations. The chromosomes in each generation are evaluated against a set of objective functions and constraints. The chromosome (e.g. one of a non-dominated set of chromosomes) that satisfies the constraints and minimizes the objective functions is decoded to produce the final solution for joint placement and chaining of VNFs.

Two variants of the cultural genetic algorithm can be devised, respectively, to be used for: (1) dedicated virtualized services where the SLA is a stringent requirement for a service provider to fulfill, and (2) best-effort virtualized services by relaxing the QoS constraints, such as the end-to-end delay requirement associated with every virtual link.

In one embodiment, affinity and anti-affinity constraints may be integrated into a genotype fixing procedure to avoid performance degradation in the cultural genetic algorithm. The affinity and anti-affinity constraints may also be integrated into an initialization phase of the genetic algorithm, during which individuals of an initial population are generated. The integration of the affinity and anti-affinity constraints reduces the population size and the number of iterations for producing the final solution. The cultural genetic algorithm runs in polynomial time when none of the constraints are relaxed.

FIG. 1 is a block diagram illustrating an example of a virtual network service 100 for which embodiments of the disclosed method may be practiced. The virtual network service 100 includes an in-line service 110 (e.g. a service function chain) and a network service 120 (e.g. an Internet Protocol (IP) multimedia subsystem). The VNFs of the in-line service 110 may provide services such as firewall, network address translations, intrusion detection systems (IDS), proxy, etc. The in-line service 110 includes interconnected VNFs which form a linear chain and may be further interconnected with network service based VNFs of the network service 120 to form a complex service topology. The VNFs are interconnected by virtual links, which indicate dependency relations between the linked VNFs. As mentioned earlier, the disclosed method for the joint placement and chaining of VNFs takes into account both in-line service VNFs and network service VNFs. That is, the disclosed method is applicable not only to service function chains which are part of a virtual network service, but also to a virtual network service including one or more service function chains.

In one embodiment, an exact approach leveraging an Integer Linear Programming (ILP) framework is used to formulate and model the problem of joint placement and chaining of VNFs. The structure of this exact approach, i.e. the objective functions and constraints, is reused in a meta-heuristic approach which incorporates a cultural genetic algorithm to be described later.

Table 1 provides the meanings of all the terms that will be used in the following description.

TABLE 1

Summary of Terms

| Terms | Meanings |
|---|---|
| $V_p$ | The set of servers |
| $V_v$ | The set of virtual network functions |
| $E_p$ | The set of physical links connecting the servers |
| $E_v$ | The set of virtual links |
| $G_p$ | The physical network topology ($V_p$, $E_p$) |
| $G_v$ | The virtual network topology ($V_v$, $E_v$) |
| VNSs | The set of Virtual Network Services |
| $Bw^{(u,v),vns}$ | Bandwidth required by virtual link (u, v) belonging to virtual network service VNS |
| $\beta_{(x,y)}^{(u,v),vns}$ | Decision variable for the chaining of VNFs |
| $\alpha_{u,x}^{vns}$ | Decision variable for the placement of VNFs |
| $D_{x,y}$ | Distance between server x and y |
| $C^{(x,y)}$ | The capacity of physical link (x, y) |
| $R_u^p$ | Amount of resource type p (CPU, Memory and Storage) required by VNF u |
| $C_x^p$ | Amount of residual resource type p (CPU, Memory and Storage) on server x |
| $\theta_{max}^{u,v}$ | The maximum allowed end-to-end delay for every virtual link (u, v) |
| $\Delta_{(x,y)}$ | The delay on the physical link (x, y) |
| $\Theta_p$ | The weight (importance) of a resource of type p (CPU, memory and storage). |
| $\Lambda$ | The monetary weight to transport one unit of traffic through one physical hop distance of the hosted VNFs. |
| $\Gamma_x$ | The monetary weight to operate a server x. |
| $\varepsilon$ | The monetary weight per unit of power consumption. |
| $P_x^{Idle}$, $P_x^{Max}$ | The idle and peak power consumption of a server x in kilowatts. |

A physical network is represented as an undirected graph $G_p=(V_p, E_p)$: where $V_p$ is the set of servers and $E_p$ is the set of physical links interconnecting the servers. A weight function V(x) is defined for each server x, which associates server x with five attributes, including the number of CPU cores, memory, storage capacity, power consumption at idle and peak states. A weight function V(l) is defined to associate each physical link l with three attributes, including the delay, distance and link capacity. These attributes indicate the available resources on each server and each physical link.

Akin to the physical network, a virtual network service is represented as an undirected graph $G_{vns}=(V_v, E_v)$: where $V_v$ is the set of VNFs and $E_v$ is the set of virtual links or dependencies between the VNFs forming a complex topology. A weight function $\tau(v)$ is defined to associated each VNF v with three attributes, including the number of CPU cores, memory and storage capacity. Similarly, $\tau(vlink)$ is defined to associate each virtual link with two attributes, including the maximum allowed end-to-end delay and the required bandwidth. These attributes indicate the resources required by the virtual network service.

Given a set of virtual network service requests VNS and a network infrastructure, the problem to be solved is to: (1) minimize the operational, traffic and energy costs respectively, and (2) find the best-fit resources for the VNFs, subject to the following constraints: (i) network's infrastructure resources are not over-committed, (ii) QoS in terms of end-to-end delays is fulfilled, and (iii) the placement and chaining of the VNFs is performed in one-step.

A mathematical model according to the ILP framework is presented herein for the joint placement and chaining of VNFs. The decision variables, the constraints and the objective functions are described herein.

The placement of a VNF belonging to a virtual network service is realized by the following decision variable:

$$\alpha_{u,x}^{vns} = \begin{cases} 1, & \text{if } vnf\ u \text{ of a } vns \text{ is placed on a server } x \\ 0, & \text{otherwise} \end{cases}$$

The following decision variable determines the chaining by taking every consecutive pair of VNFs:

$$\beta_{(x,y)}^{(u,v),vns} = \begin{cases} 1, & \text{if } vnfs\ u \text{ and } v \text{ are chained via} \\ & \text{physical link}(x, y) \\ 0, & \text{otherwise} \end{cases}$$

The constraints include the following:

$$\Sigma_{vns}\Sigma_u \alpha_{u,x}^{vns} \times R_u^{CPU} \leq C_x^{CPU} \forall x \in V_p \quad (1)$$

$$\Sigma_{vns}\Sigma_u \alpha_{u,x}^{vns} \times R_u^{Memory} \leq C_x^{Memory} \forall x \in V_p \quad (2)$$

$$\Sigma_{vns}\Sigma_u \alpha_{u,x}^{vns} \times R_u^{Storage} \leq C_x^{Storage} \forall x \in V_p \quad (3)$$

$$\Sigma_{vns}\Sigma_{u,v} \beta_{(x,y)}^{(u,v),vns} \times Bw^{(u,v),vns} \leq C^{(x,y)} \forall (x,y) \in E_p \quad (4)$$

$$\Sigma_{u,v} \beta_{(x,y)}^{(u,v),vns} \times \Lambda_{(x,y)}^{(u,v)} \leq \theta_{max}^{(u,v)} \forall (x,y) \in E_p, \\ \forall vns \in VNSs \quad (5)$$

$$\alpha_{u,x}^{vns} + \alpha_{v,y}^{vns} \leq \beta_{(x,y)}^{(u,v),sfc} + 1 \forall (x,y) \in E_p, \forall (u,v) \in E_v, \\ \forall vns \in VNSs \quad (6)$$

$$\alpha_{u,x}^{vns} + \alpha_{v,y}^{vns} + \beta_{(x,y)}^{(u,v),vns} \leq 2 \forall (x,y) \in E_p, \forall (u,v) \in E_v, \\ \forall vns \in VNSs \quad (7)$$

$$\Sigma_y \beta_{(x,y)}^{(u,v),vns} - \Sigma_y \beta_{(y,z)}^{(u,v),vns} = \alpha_{u,x}^{vns} - \alpha_{v,x}^{vns} \forall (u,v) \\ \in E_v, \forall x \in V_p, \forall vns \in VNSs \quad (8)$$

$$\Sigma_x \alpha_{u,x}^{vns} = 1 \forall u \in V_v, \forall vns \in VNSs \quad (9)$$

Constraints (1, 2 and 3) state that the resources of servers, in terms of CPU, memory and storage are not overcommitted.

Constraint (4) states that the amount of traffic that is circulating along the virtual links, does not exceed the capacity of physical links.

Constraint (5) states that the end-to-end delay of each virtual link of each virtual network service is within the maximum allowed delay.

Constraint (6) guarantees the joint placement and chaining of VNFs for each virtual network service with respect to two linked VNFs placed at one server or two linked servers.

Constraint (7) states that no physical link can be allocated to a pair of VNFs deployed on the same host for each virtual network service.

Constraint (8) complements constraint (6) in the joint placement and chaining of VNFs with respect to two VNFs placed at two non-adjacent servers; e.g. A path between two VNFs that are placed at different servers that are not adjacent to each other i.e. two servers that are not linked by a direct physical link but are linked through a set of switches. That is, a path is identified between these two VNFs.

Constraint (9) ensures that a VNF instance is deployed only on one host.

A multi-objective approach is adopted with four conflicting objective functions, namely F1, F2 F3 and F4.

Objective function $F_1=\text{Min}\ [\Sigma_{vns}[\Sigma_u\Sigma_x \alpha_{u,x}^{vns} \times \Gamma_x]]$, where F1 stands for minimizing the total operational cost, which is a function of the number of VNFs and $\Gamma_x$.

Objective function $F_2=\text{Min}\ [\Sigma_{vns}\ \Sigma_{(x,y)}\ D_{x,y}\ \Sigma_{(u,v)} \Lambda \times Bw^{(u,v),vns} \times \beta_{(x,y)}^{(u,v),vns}]$, where F2 stands for minimizing the total cost to transport traffic of the accepted virtual network services through physical links. It is a function of the distance $D_{x,y}$, $Bw^{(u,v),vns}$ and $\Lambda$.

Objective function $$F_3 = \text{Min}\left[\sum_{vns}\left[\sum_u\sum_x \alpha_{u,x}^{vns} \sum_{p \in P} \Theta_p\left[1 - \frac{R_u^p}{C_x^p}\right]^2\right]\right].$$

Objective function $F_3$, also referred to as the best-fit function. Since VNFs of virtual network services may have different requirements for various resources such as CPU, memory and storage, objective function $F_3$ finds the best-fit resources across the three dimensions (capacities of the CPU, memory and storage) to be allocated to the virtual network services in view of remaining server resources. The smaller the value of $F_3$ the more fit the servers chosen to host the VNFs. F3 speeds up the integer linear program.

Objective function $$F_4 = \text{Min}\ \varepsilon \times \left[\sum_{vns}\left[\sum_u\sum_x \alpha_{u,x}^{vns}\left(P_x^{Idle} + \left(P_x^{Max} - P_x^{Idle}\right) \times \frac{R_u^{CPU}}{C_x^{CPU}}\right)\right]\right],$$

where F4 stands for minimizing the total energy cost which is a function of the idle and max power consumption of servers, CPU utilization and $\varepsilon$.

The exact approach for the problem of joint placement and chaining of VNFs is appropriate typically for small instances of the problem. Given the complexity of the problem in general, which is NP-Hard, it may not be feasible to use the exact approach for online (i.e. real-time) deployments.

Embodiments of the invention provide a meta-heuristic approach and a method (i.e. the disclosed method) based on the meta-heuristic approach. The meta-heuristic approach copes with medium and large-scale instances of the problem and finds close-to-optimal solutions in a reasonable amount of time for online deployments. The meta-heuristic approach reuses the aforementioned objective functions and constraints of the ILP framework for the problem of joint placement and chaining of VNFs not limited to in-line services. The meta-heuristic approach incorporates an evolutionary multi-objective cultural genetic algorithm. The evolutionary process uses crossover, mutation and selection operations.

One key idea of the disclosed method according to the meta-heuristic approach lies in exploiting the abstraction and flexibility offered by genetic algorithms using a genotype encoding mechanism. A genotype is generated by enumerating all the virtual links interconnecting the VNFs. The genotype carries information of the virtual network service such as: the resources required by the VNFs in terms of CPU, memory, storage capacity, the maximum allowed end-to-end delay of each virtual link, the required bandwidth of each virtual link, as well as affinity and anti-affinity constraints. The genotype encodes a mapping between these virtual links and tuples. A tuple is denoted by a pair of servers (e.g. tuple T=(server1, server2), where server1 and server2 are connected by a physical path (which may be a direct physical link or a path of multiple physical links). A virtual link is denoted by its two endpoints (e.g. virtual link V=(VNF1, VNF2)). A mapping between a virtual link and a tuple indicates the placement of the two endpoint VNFs at the server pair (e.g. VNF1 is placed at server1 and VNF2 is placed at server2); in other words, it is a mapping between the virtual link and the physical path connecting the server pairs. Thus, the mapping not only places the endpoint VNFs at corresponding servers but also, in the same step, chains the VNFs via the physical path.

The disclosed method makes use of a cultural genetic algorithm which is built on top of a genetic algorithm such as Non-dominated Sorting Genetic Algorithm II (NSGA-II). The output of the algorithm is a plurality of non-dominated solutions; i.e. a non-dominated set of chromosomes. One of the chromosomes from the non-dominated set may be selected as the final solution; e.g. the chromosome that minimizes one or more of the objective functions may be selected as the final solution.

The disclosed method improves the embedded search technique of the cultural genetic algorithm using genetic operators, namely, crossover, mutation and selection for evolving a population of individuals (i.e. chromosomes) by leveraging the concept of the belief space. The belief space is updated after each iteration by the best individuals of the population. Among others, the belief space includes history knowledge, normative knowledge, and situational knowledge.

In one embodiment, history knowledge is used to track the changes within the underlying physical network to guide the search space towards more productive areas of the search. In its simplest form, history knowledge is applied to a procedure which sorts the servers across the dimension(s) of CPU, memory or storage and returns their IDs according to the sorting. Thus, servers without sufficient resources may not participate as candidates within the search space. The procedure is not limited to resources dimensions as it can be adapted to other aspects if needed.

In one embodiment, normative knowledge is used to influence the crossover genetic operator by keeping only the top individuals of the current generation; for example, the top 20%. Situational knowledge, which stores the best individuals found during the whole evolutionary process, is used to influence the selection genetic operator. A number of crossover, mutation and selection genetic operators are known in the art. In one embodiment, the 1-cutpoint crossover, swapping-based mutation and tournament selection may be used.

The disclosed method includes the following aspects. In the first aspect, the inputs are represented as graphs for both virtual network requests and physical network infrastructure. The virtual network request includes the VNFs instances with their dependencies, the required resources, and affinity and anti-affinity constraints. The physical network infrastructure includes the servers, physical links between the servers, distances, delays, and link capacities. The second aspect leverages a genotype encoding technique for use in the genetic algorithm to efficiently tackle the problem of jointly placing and chaining VNFs in one step by mapping virtual links connecting peer VNFs (i.e. directly-linked VNFs) to server tuples. This genotype encoding technique enables the disclosed method to be scalable for dealing with complex topologies. The third aspect consists of a decision process, which evaluates the aforementioned objective functions subject to the aforementioned set of constraints based on the inputs including the virtual and physical network topologies. The last aspect is the outputs from the decision process.

Figures 2A, 2B:
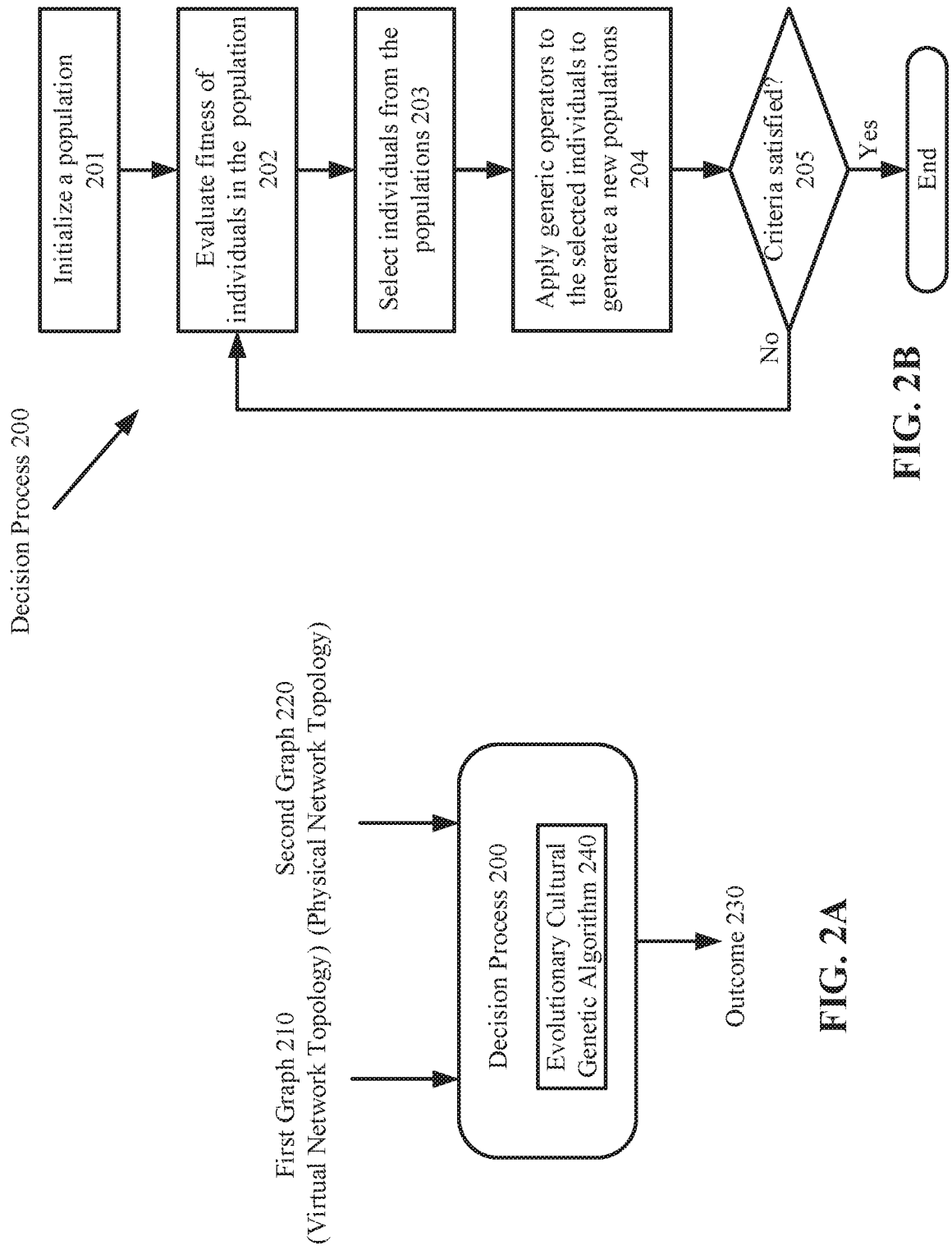
FIG. 2A is a block diagram illustrating a decision process according to one embodiment.
FIG. 2B is a block diagram illustrating operations of an evolutionary cultural genetic algorithm which forms the core of the decision process of FIG. 2A according to one embodiment.

FIG. 2A is a block diagram illustrating a decision process 200 according to one embodiment. The block diagram shows the inputs and the outputs of the decision process 200.

The decision process 200 receives a first graph 210 representing a virtual network topology as input. The first graph 210 indicates the resource requirements of the VNFs. The vertices of the first graph 210 correspond to the VNFs and the edges correspond to the virtual links or the interconnectivity between the VNFs. A weight function associates two dimensions to each edge, respectively, the maximum allowed end-to-end delay and bandwidth requirements (i.e. link capacity). Each vertex is associated with three attributes: the required number of CPU cores, memory and storage capacity. In one embodiment, the affinity and anti-affinity constraints of the VNFs may also be received as input.

The decision process 200 also receives a second graph 220 representing a physical network topology as input. The second graph 220 indicates the available resources of the servers and the physical links. The vertices of the second graph 220 correspond to the servers and the edges to the physical links connecting the servers. A weight function associates three dimensions to each edge, respectively, the distance in terms of the number of links, link capacities and delays. Each vertex has five attributes: the number of CPU cores, memory, storage capacity, idle and maximum power consumption.

The decision process 200 performs an evolutionary cultural genetic algorithm 250 on the inputs for jointly placing and chaining the VNFs. The decision process 200 produces one or more solutions which minimize the objective functions subject to a set of constraints. The one or more solutions may be decoded to obtain the locations (i.e. the placement) of the VNFs and the path interconnecting the VNFs within the physical infrastructure.

In one embodiment, the decision process 200 produces an outcome 230 including a set of metrics (e.g. the length of runtime, the number of accepted or rejected requests, residual resources, cost function values such as energy cost, number of servers used and the traffic cost), the locations of the VNFs and the path interconnecting the VNFs within the physical infrastructure.

FIG. 2B is a block diagram illustrating operations of the decision process 200 of FIG. 2A according to one embodiment. The evolutionary cultural genetic algorithm 250 forms the core of the decision process 200. In one embodiment, the decision process 200 may be executed by a system, such as the system 700 of FIG. 7, the system 800 of FIG. 8, or a cloud computing system 900 of FIG. 9.

In one embodiment, the system initializes a population of individuals (e.g. chromosomes) at step 201. The system at step 202 evaluates the fitness of the individuals in the population. Based on the evaluation, the system selects a set of individuals from the population at step 203. The system at step 204 applies one or more genetic operators to the selected individuals to generate a new population. The decision process 200 ends if predetermined criteria are satisfied (e.g. the maximum number of iterations has been reached) at step 205; otherwise, the decision process 200 goes back to step 202 to evaluate the fitness of the individuals in the new population, and continues until the predetermined criteria are satisfied.

Further details of the decision process 200 are provided herein. Each individual (i.e. chromosome) in each population is encoded by a custom genotype encoding technique. The flexibility and abstraction provided by genetic algorithms are leveraged to design the custom genotype encoding tied specifically for the joint placement and chaining of VNFs. The key idea is to search for a mapping between VNFs connected by virtual links and server tuples. Each server tuple is a server pair connected by a physical path of one or more physical links. By encoding the virtual links within the locus level, the joint placement and chaining of VNFs can be performed in one-step.

Figures 3A, 3B:
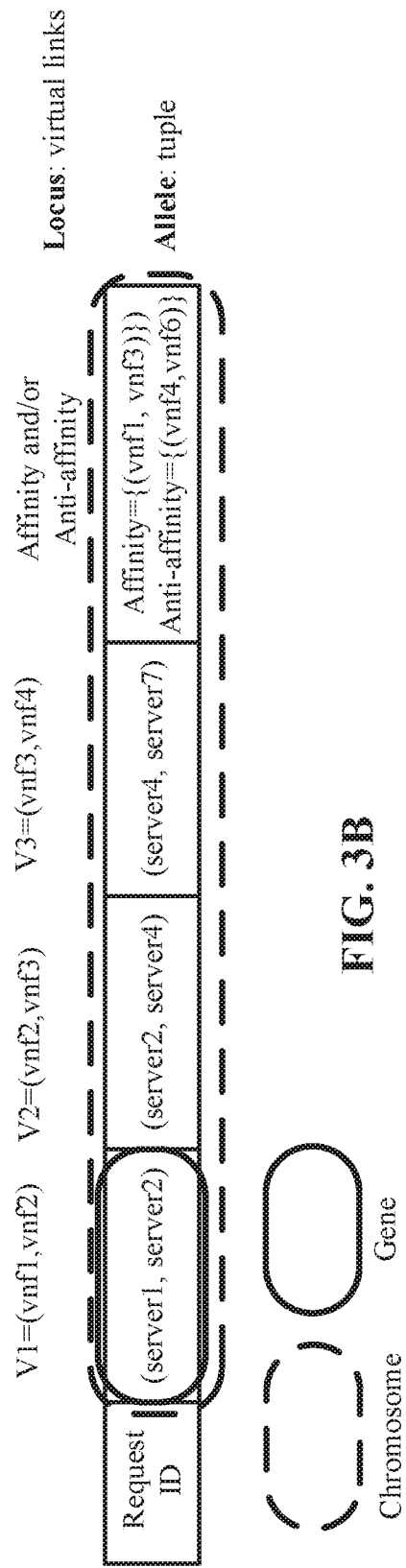
FIG. 3A and FIG. 3B illustrate examples of genotype encoding according to some embodiments.

FIG. 3A and FIG. 3B illustrate examples of genotype encoding according to some embodiments. A chromosome comprises an ordered sequence of genes. The ordered sequence follows a locus formed by enumerated virtual links of a virtual network service. For example, the first gene may embody a mapping between endpoint VNFs of a first virtual link and a corresponding server tuple (denoted as (1,2) in FIG. 3A and (server1, server2) in FIG. 3B). Affinity and anti-affinity constraints on the VNF placement may be incorporated within the same chromosome to be carried through the evolutionary process.

Initializing the population can be realized either deterministically or randomly. A deterministic initialization calls for using methods such as a first-fit heuristic, or using the ILP solution. For example, the Simplex algorithm may be used as it starts by generating initial solutions and iterating through them before reaching an optimal solution. However, the deterministic initialization can negatively impact the overall runtime and algorithmic complexity of the genetic algorithm. Alternatively, the chromosomes in a population may be initialized randomly.

Given the custom-made nature of the genotype encoding and the fact that the chromosomes are to be evaluated through a fitness evaluation, checking the validity of chromosomes before their evaluation can significantly improve the performance of the disclosed method. Therefore, an algorithm GenoFix, a.k.a Genotype Fixing, is provided (shown in FIG. 4) which checks and fixes chromosomes before their evaluation.

Genetic operators are part of an evolutionary algorithm as they are the mechanisms in charge of evolving the population along the way of the evolutionary process. The genetic operators used herein include, but are not limited to, crossover operators and mutation operators.

Crossover operators are used for varying the population to explore several search areas. As an example, the 1-cutpoint binary crossover operator may be adopted which takes two chromosomes, i.e. parents, and produces two new chromosomes, i.e. children. More specifically, a 1-cutpoint, randomly chosen from the size of the chromosome, may be applied to the two parents to split them into two parts. Then, the first child is made by merging the left part of the first parent with the right part of the second parent. The second child is made following the same principle except that it starts with the right part of the first parent.

Mutation operators may be integrated into evolutionary genetic algorithms for exploitation purposes. Mutations introduce perturbations on the chromosomes for diversity purposes. The disclosed method makes use of a swapping mutation operator. In a nutshell, this unary mutation operator takes as input a chromosome and two random gene positions. Then the mutation operator swaps the gene positions and returns the resulting chromosome. It is understood that other mutation and crossover operators can be used in the disclosed method.

Hereunder, a description of the cultural genetic algorithm is provided in FIG. 4 and FIG. 5. The cultural genetic algorithm works in four phases. Referring to FIG. 4, the first phase "Initialization" initializes three variables, namely, X_L, X_R, X_I to record the virtual links having the same left location, right location and common locations, respectively. The second phase "Decoding the chromosome" extracts the information present in each gene, i.e. the locations of the VNFs within each corresponding tuple. Then, all the virtual links having similar endpoints (i.e. either the same left or the same right endpoint) and common endpoints are stored. The third phase calls the affinity and anti-affinity algorithm (shown in FIG. 5) when there are affinity constraints, anti-affinity constraints, both of the affinity and anti-affinity constraints, or none of such constraints. The last phase "Fixing the chromosome" checks and matches every virtual link within the chromosome with those present in the variables defined in the initialization phase. GetRightLocation and GetLeftLocation functions get the right, left and same location of the VNFs within the tuple respectively and SetSameLocation sets the same location of the VNFs within the variables respectively.

Finally, Dijkstra's algorithm is leveraged for chaining the VNFs located on different locations (i.e. different servers) using GetPathUsingDijkstra and SetPath functions. It is worth mentioning that priority queues may be used for the implementation of Dijkstra's algorithm to reduce its algorithmic complexity to $\mathcal{O}(E \times Log(V))$. To sum it up, a salient feature of the disclosed method is the joint placement and chaining of VNFs performed at the genotype level and integrated within the GenoFix algorithm.

The affinity and anti-affinity algorithm shown in FIG. 5 is integrated into the custom-made genotype according to one embodiment. The algorithm starts with the affinity constraint then the anti-affinity constraint. This order is driven by the observation that anti-affinity constraint may be conflicting with the affinity constraint, i.e. the whole structure of the chromosome may turn out to be invalid because of the location constraints.

As shown in FIG. 5, the algorithm begins with decoding the slice of the chromosome having the affinity constraint. Then, it goes through all the virtual links within the chromosome and checks whether the IDs of the VNFs within the affinity constraint appear in the chromosome. If the IDs appear, then the VNFs are set to be in the same location. The affinity check can be performed by checking both the left and right parts of the virtual links. The same procedure can be followed for the anti-affinity constraints.

The complexity of the cultural genetic algorithm depends on several parameters and components. The components are described individually rather than globally for more clarifications. To start with, the complexity of NSGA-II, which forms the core of the cultural algorithm, is known to be $\mathcal{O}(M \times N^2)$ where N is the population size and M is the number of objective functions. In the aforementioned mathematical model there are four objective functions. Thus, the complexity of NSGA-II $\cong \mathcal{O}(N^2)$ since M is a fixed parameter and not a variable.

The complexity of the repairing algorithm GenoFix is $\mathcal{O}(C^2 \times E \times Log(V))$ as it makes use of Dijkstra's algorithm using priority queues where C is the size of the chromosome, E is the set of physical links and V the set of servers of the network infrastructure. The affinity and anti-affinity algorithm within the GenoFix algorithm has a complexity of $\mathcal{O}(C)$ as it mainly depends on the size of the chromosome. Finally, the complexity of history knowledge is $\mathcal{O}(V \times Log(V))$ using Timsort algorithm to sort the servers in order to reduce the search space of NSGA-II. It is worth mentioning that the complexity analysis performed herein is in its worst-case scenario form.

Figure 6:
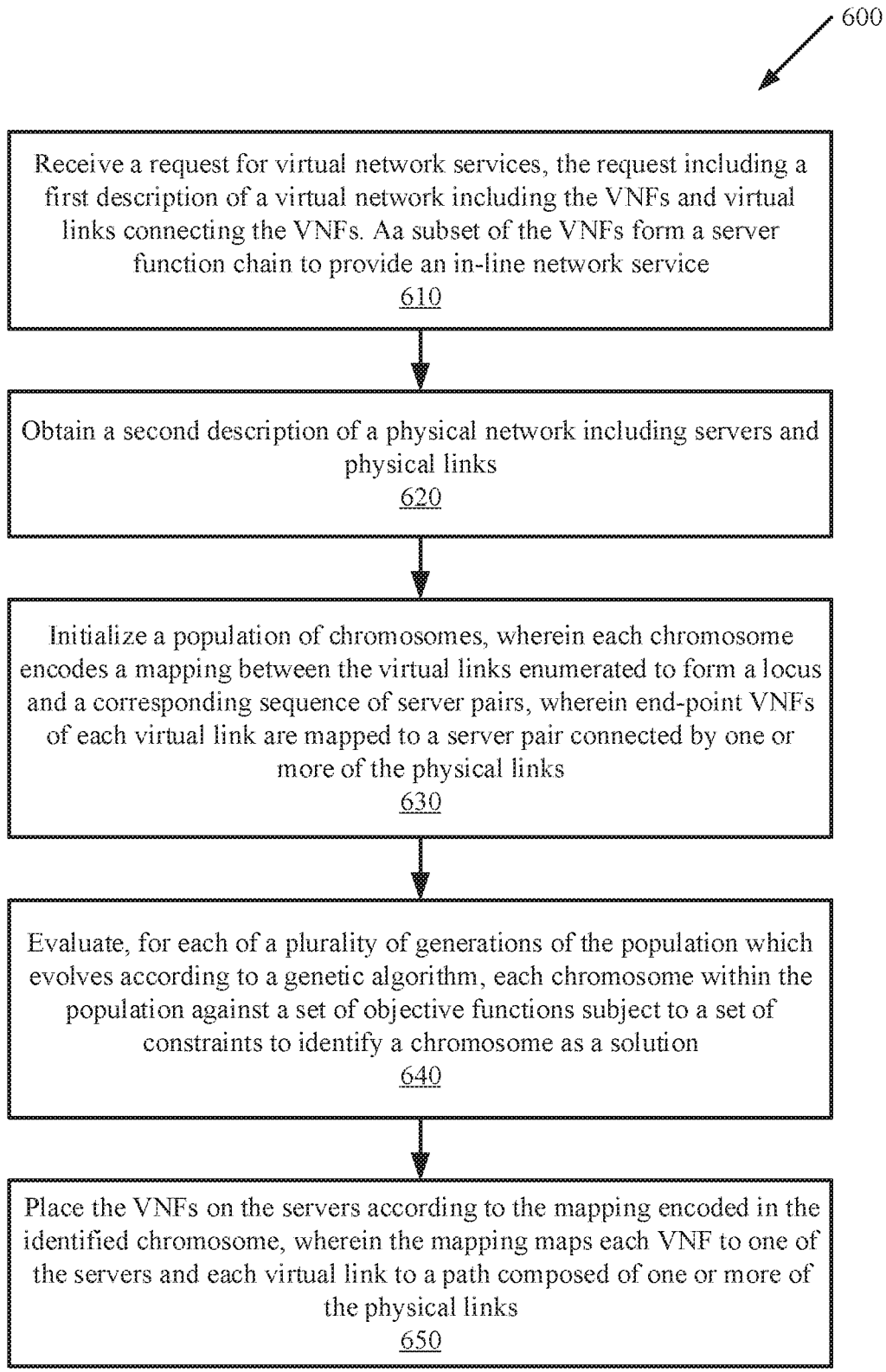
FIG. 6 is a flowchart illustrating a method for joint placement and chaining of VNFs according to one embodiment.

FIG. 6 is a flowchart illustrating a method 600 for joint placement and chaining of a scalable number of VNFs according to one embodiment. The method 600 may be performed by a system, such as the system 700 of FIG. 7, the system 800 of FIG. 8, or a cloud computing system 900 of FIG. 9.

The method 600 may start at step 610 when the system receives a request for virtual network services, the request including a first description of a virtual network, which includes the VNFs and virtual links connecting the VNFs. A subset of the VNFs form a server function chain to provide an in-line network service. The system at step 620 obtains a second description of a physical network including servers and physical links. The system at step 630 initializes a population of chromosomes, wherein each chromosome encodes a mapping between the virtual links enumerated to form a locus and a corresponding sequence of server pairs. The end-point VNFs of each virtual link are mapped to a server pair connected by one or more of the physical links. For each of a plurality of generations of the population which evolves according to a genetic algorithm, the system at step 640 evaluates each chromosome within the population against a set of objective functions subject to a set of constraints to identify a chromosome as a solution. At step 650, the system places the VNFs on the servers according to the mapping encoded in the identified chromosome. This mapping maps each VNF to one of the servers and each virtual link to a path composed of one or more of the physical links.

In one embodiment, the output of the method 600 includes locations of the VNFs and the path interconnecting the VNFs. In one embodiment, the output of the method 600 further includes a set of metrics, such as the length of runtime, the number of accepted/rejected requests, the amount of residual resources, cost function values (e.g. energy cost, the number of servers used and the traffic cost, etc.), as mentioned above in connection with the outcome 230 of the decision process 200 in FIG. 2A.

In one embodiment, each chromosome in the population of chromosomes complies with affinity and anti-affinity constraints specified by the request with respect to the placement of the VNFs. The population of chromosomes may be initialized such that each virtual link is randomly assigned to a path connecting a server pair. Prior to evaluating each chromosome, the system may check the chromosome against the objective functions for an invalid genotype. The invalid genotype may include an invalid mapping between an end-point VNF of a virtual link and a server. If the chromosome is found to contain an invalid genotype, the system fixes the invalid genotype and then proceeds to evaluate the chromosome.

In one embodiment, a system may identify a chromosome including a given virtual link specified by two end-point VNFs, where the two end-point VNFs are mapped to two non-adjacent servers. Prior to evaluation of the chromosome against the objective functions, the system finds the shortest path composed of two or more physical links between the two non-adjacent servers such that the given virtual link is mapped to the shortest path.

Referring to step 610 and step 620 of method 600, the first description indicates available resources on each server and each physical link, and the second description indicates resources including end-to-end delays required by the virtual network service.

In one embodiment, the objective functions include a cost function for transporting traffic of the virtual network services through the physical links, wherein the cost function is a function of a distance between each server pair, a bandwidth required by each virtual link, and a cost for transporting one traffic unit through one physical hop distance. In one embodiment, the objective functions include a best-fit function which finds the required server resources including capacities of CPU, memory and storage, to be allocated to the virtual network services in view of remaining server resources. Additional objective functions may also be used.

In one embodiment, the resources in the physical network may be sorted according to a predetermined metric to establish a history knowledge of the physical network.

In one embodiment, each chromosome may be evaluated against the objective functions subject to the set of constraints with one or more of the constraints relaxed with respect to QoS for the physical network to provide best-effort virtualized services. In another embodiment, each chromosome may be evaluated against the objective functions subject to all of the constraints in the set of constraints with respect to an SLA for the physical network to provide dedicated virtualized services.

Among other constraints, the set of constraints may include a maximum value of an end-to-end delay for each virtual link of each virtual network service. The set of constraints may also include constraints for enforcing valid placement of the VNFs and valid allocation of the physical links in view of physical network topology.

This disclosure provides and formulates a general form of virtual network services together with in-line services, i.e. service function chains, mathematically through the ILP framework. To cope with the computational complexity of large scale instances, a fast and scalable evolutionary cultural genetic algorithm is designed and implemented for the joint placement and chaining of virtualized services through a multi-objective meta-heuristic approach. The evaluation and experimental results show that the approach is fast, scalable and provides close to optimal solutions while being efficient with fewer iterations and a smaller population size as compared with ILP solutions.

Figure 7:
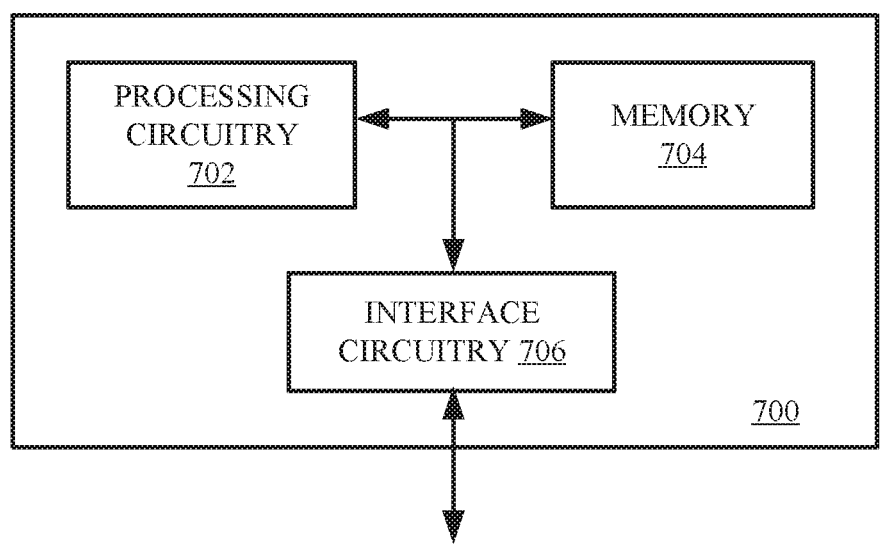
FIG. 7 is a block diagram of a network node according to one embodiment.

FIG. 7 is a block diagram illustrating a network node 700 according to an embodiment. In one embodiment, the network node 700 may be a server in an operator network or in a data center. The network node 700 includes circuitry which further includes processing circuitry 702, a memory 704 or instruction repository and interface circuitry 706. The interface circuitry 706 can include at least one input port and at least one output port. The memory 704 contains instructions executable by the processing circuitry 702 whereby the network node 700 is operable to perform the various embodiments described herein.

Figure 8:
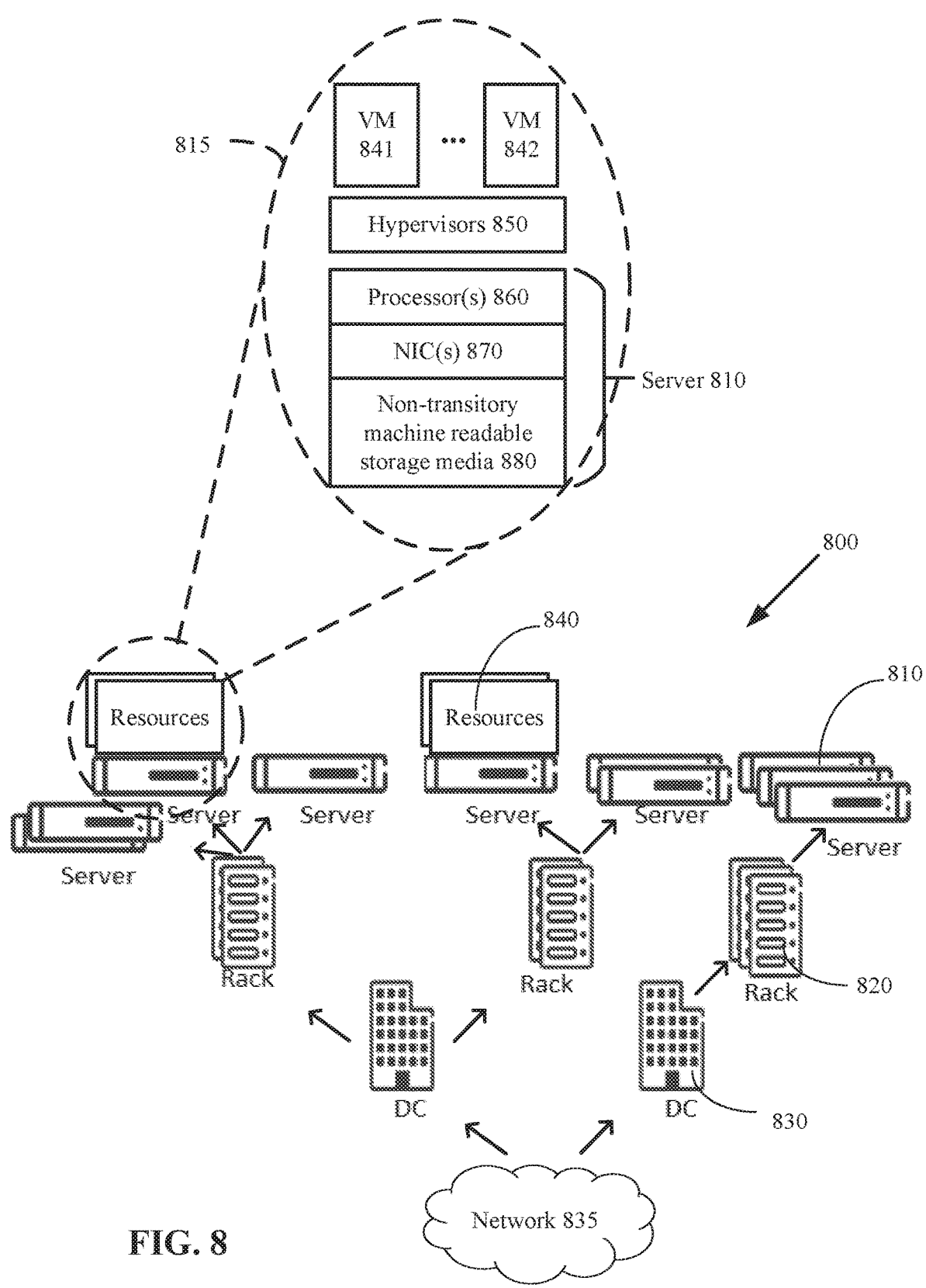
FIG. 8 is an architectural overview of a cloud computing environment according to one embodiment.

FIG. 8 is an architectural overview of a cloud computing environment 800 that comprises a hierarchy of cloud computing entities. The cloud computing environment 800 can include a number of different data centers (DCs) 830 at different geographic sites connected over a network 835. Each data center 830 site comprises a number of racks 820, each rack 820 comprises a number of servers 810. It is understood that in alternative embodiments a cloud computing environment may include any number of data centers, racks and servers. A set of the servers 810 may be selected to host resources 840. In one embodiment, one or more of the servers 810 may perform the method of joint placement and chaining of VNFs (e.g. the method 600 of FIG. 6). In one embodiment, the servers 810 and the physical links connecting the servers 810 may provide the physical network infrastructure on which the VNFs are placed.

In one embodiment, the servers 810 provide an execution environment for hosting entities and their hosted entities, where the hosting entities may be service providers and the hosted entities may be the services provided by the service providers. Examples of hosting entities include virtual machines (which may host containers) and containers (which may host contained components), among others. A container is a software component that can contain other components within itself. Multiple containers can share the same operating system (OS) instance, and each container provides an isolated execution environment for its contained component. As opposed to VMs, containers and their contained components share the same host OS instance and therefore create less overhead. Each of the servers 810, the VMs, and the containers within the VMs may be configured to perform the various embodiments as have been described herein.

Further details of the server 810 and its resources 840 are shown within a dotted circle 815 of FIG. 8, according to one embodiment. The cloud computing environment 800 comprises a general-purpose network device (e.g. server 810), which includes hardware comprising a set of one or more processor(s) 860, which can be commercial off-the-shelf (COTS) processors, dedicated Application Specific Integrated Circuits (ASICs), or any other type of processing circuit including digital or analog hardware components or special purpose processors, and network interface controller(s) 870 (NICs), also known as network interface cards, as well as non-transitory machine-readable storage media 880 having stored therein software and/or instructions executable by the processor(s) 860.

During operation, the processor(s) 860 execute the software to instantiate a hypervisor 850 and one or more VMs 841, 842 that are run by the hypervisor 850. The hypervisor 850 and VMs 841, 842 are virtual resources, which may run node instances in this embodiment. In one embodiment, the node instance may be implemented on one or more of the VMs 841, 842 that run on the hypervisor 850 to perform the various embodiments as have been described herein. In one embodiment, the node instance may be instantiated as a network node performing the various embodiments as described herein.

Embodiments may be represented as a software product stored in a machine-readable medium (such as the non-transitory machine-readable storage media 880, also referred to as a computer-readable medium, a processor-readable medium, or a computer usable medium having a computer readable program code embodied therein). The non-transitory machine-readable medium 880 may be any suitable tangible medium including a magnetic, optical, or electrical storage medium including a diskette, compact disk read only memory (CD-ROM), digital versatile disc read-only memory (DVD-ROM) memory device (volatile or non-volatile) such as hard drive or solid state drive, or similar storage mechanism. The machine-readable medium may contain various sets of instructions, code sequences, configuration information, or other data, which, when executed, cause a processor to perform steps in a method according to an embodiment. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art.

What is claimed is:

1. A method for joint placement and chaining of a scalable number of VNFs, comprising:
   receiving a request for virtual network services, the request including a first description of a virtual network including the VNFs and virtual links connecting the VNFs, wherein a subset of the VNFs form a server function chain to provide an in-line network service;
   obtaining a second description of a physical network including servers and physical links;
   initializing a population of chromosomes, wherein each chromosome encodes a mapping between the virtual links enumerated to form a locus and a corresponding sequence of server pairs, wherein end-point VNFs of each virtual link are mapped to a server pair connected by one or more of the physical links;
   evaluating, for each of a plurality of generations of the population which evolves according to a genetic algorithm, each chromosome within the population against a set of objective functions subject to a set of constraints to identify a chromosome as a solution, wherein the objective functions include: a cost function for transporting traffic of the virtual network services through the physical links, wherein the cost function is a function of a distance between each server pair, a bandwidth required by each virtual link, and a cost for transporting one traffic unit through one physical hop distance; and
   placing the VNFs on the servers according to the mapping encoded in the identified chromosome, which maps each VNF to one of the servers and each virtual link to a path composed of one or more of the physical links.

2. The method of claim 1, wherein each chromosome in the population of chromosomes complies with affinity and anti-affinity requirements specified by the request with respect to the placement of the VNFs.

3. The method of claim 1, further comprising: initializing the population of chromosomes in which each virtual link is randomly assigned to a path connecting a server pair.

4. The method of claim 1, wherein evaluating each chromosome further comprises:
   checking the chromosome prior to evaluation of the chromosome against the objective functions for an invalid genotype, wherein the invalid genotype includes an invalid mapping between an end-point VNF of a virtual link and a server; and fixing the invalid genotype if the chromosome contains the invalid genotype.

5. The method of claim 1, wherein evaluating each chromosome further comprises:
identifying a given virtual link specified by two end-point VNFs mapped to two non-adjacent servers in the chromosome; and
finding a shortest path composed of two or more physical links between the two non-adjacent servers prior to evaluation of the chromosome against the objective functions.

6. The method of claim 1, wherein the first description indicates available resources on each server and each physical link, and the second description indicates resources including end-to-end delays required by the virtual network service.

7. The method of claim 1, wherein the objective functions include: a best-fit function which finds the required server resources including capacities of a central processing unit (CPU), memory and storage, to be allocated to the virtual network services in view of remaining server resources.

8. The method of claim 1, wherein evaluating each chromosome further comprises:
evaluating each chromosome against the objective functions subject to the set of constraints with one or more of the constraints relaxed with respect to Quality of Service (QoS) for the physical network to provide best-effort virtualized services.

9. The method of claim 1, wherein evaluating each chromosome further comprises:
evaluating each chromosome against the objective functions subject to all of the constraints in the set of constraints with respect to a Service Level Agreement (SLA) for the physical network to provide dedicated virtualized services.

10. The method of claim 1, wherein the set of constraints include a maximum value of an end-to-end delay for each virtual link of each virtual network service.

11. The method of claim 1, wherein the set of constraints include constraints for enforcing valid placement of the VNFs and valid allocation of the physical links in view of physical network topology.

12. A network node comprising:
processing circuitry; and
memory to store instructions executable by the processing circuitry for joint placement and chaining of a scalable number of VNFs,
the network node operative to:
receive a request for virtual network services, the request including a first description of a virtual network including the VNFs and virtual links connecting the VNFs, wherein a subset of the VNFs form a server function chain to provide an in-line network service;
obtain a second description of a physical network including servers and physical links;
initialize a population of chromosomes, wherein each chromosome encodes a mapping between the virtual links enumerated to form a locus and a corresponding sequence of server pairs, wherein end-point VNFs of each virtual link are mapped to a server pair connected by one or more of the physical links;
evaluate, for each of a plurality of generations of the population which evolves according to a genetic algorithm, each chromosome within the population against a set of objective functions subject to a set of constraints to identify a chromosome as a solution,
wherein the objective functions include: a cost function for transporting traffic of the virtual network services through the physical links, wherein the cost function is a function of a distance between each server pair, a bandwidth required by each virtual link, and a cost for transporting one traffic unit through one physical hop distance; and
place the VNFs on the servers according to the mapping encoded in the identified chromosome, which maps each VNF to one of the servers and each virtual link to a path composed of one or more of the physical links.

13. The network node of claim 12, wherein each chromosome in the population of chromosomes complies with affinity and anti-affinity requirements specified by the request with respect to the placement of the VNFs.

14. The network node of claim 12, wherein the network node is further operative to: initialize the population of chromosomes in which each virtual link is randomly assigned to a path connecting a server pair.

15. The network node of claim 12, wherein when evaluating each chromosome, the network node is further operative to:
check the chromosome prior to evaluation of the chromosome against the objective functions for an invalid genotype, wherein the invalid genotype includes an invalid mapping between an end-point VNF of a virtual link and a server; and
fix the invalid genotype if the chromosome contains the invalid genotype.

16. The network node of claim 12, wherein when evaluating each chromosome, the network node is further operative to:
identify a given virtual link specified by two end-point VNFs mapped to two non-adjacent servers in the chromosome; and
find a shortest path composed of two or more physical links between the two non-adjacent servers prior to evaluation of the chromosome against the objective functions.

17. The network node of claim 12, wherein the first description indicates available resources on each server and each physical link, and the second description indicates resources including end-to-end delays required by the virtual network service.

18. The network node of claim 12, wherein the objective functions include: a best-fit function which finds the required server resources including capacities of a central processing unit (CPU), memory and storage, to be allocated to the virtual network services in view of remaining server resources.

19. The network node of claim 12, wherein when evaluating each chromosome, the network node is further operative to:
evaluate each chromosome against the objective functions subject to the set of constraints with one or more of the constraints relaxed with respect to Quality of Service (QoS) for the physical network to provide best-effort virtualized services.

20. The network node of claim 12, wherein when evaluating each chromosome, the network node is further operative to:
evaluate each chromosome against the objective functions subject to all of the constraints in the set of constraints with respect to a Service Level Agreement (SLA) for the physical network to provide dedicated virtualized services.

21. The network node of claim 12, wherein the set of constraints include a maximum value of an end-to-end delay for each virtual link of each virtual network service.

22. The network node of claim 12, wherein the set of constraints include constraints for enforcing valid placement of the VNFs and valid allocation of the physical links in view of physical network topology.

* * * * *